United States Patent [19]

Jonas

[11] Patent Number: 4,671,470
[45] Date of Patent: Jun. 9, 1987

[54] METHOD FOR FASTENING AIRCRAFT FRAME ELEMENTS TO SANDWICH SKIN PANELS COVERING SAME USING WOVEN FIBER CONNECTORS

[75] Inventor: Paul J. Jonas, Wichita, Kans.

[73] Assignee: Beech Aircraft Corporation, Wichita, Kans.

[21] Appl. No.: 754,951

[22] Filed: Jul. 15, 1985

[51] Int. Cl.[4] ............................ B64C 3/18; B32B 5/00
[52] U.S. Cl. ...................................... 244/119; 244/131
[58] Field of Search ............... 244/124, 123, 119, 120, 244/131; 156/182, 93, 257; 428/116, 105, 113, 114

[56] References Cited

U.S. PATENT DOCUMENTS

| | | | |
|---|---|---|---|
| 3,771,748 | 11/1973 | Jones | 244/119 |
| 4,201,815 | 5/1980 | Weiland et al. | 428/113 |
| 4,395,450 | 7/1983 | Whitener | 244/123 |
| 4,565,595 | 1/1986 | Whitener | 156/172 |

Primary Examiner—Michael Ball
Attorney, Agent, or Firm—Edwin L. Spangler, Jr.

[57] ABSTRACT

This invention relates to improvements in the method by which elongate frame elements such as the spars in aircraft wings are fastened to the skin panels covering same where these skin panels are of the sandwich type having inner and outer facesheets with a core bonded therebetween, such method consisting of preparing the panel to receive its frame elements by cutting elongate grooves spanwise through the inner facesheet and the core therebeneath while leaving the outer facesheet intact; bridging the gap thus produced in the inner facesheet with one bundle of filaments adhesively bonded thereto, the latter being contained in a woven connector in the form of a strap or band running lengthwise of the groove, and this filament bundle forming an endless strand of yarn that is laid back and forth transversely across the gap in side-by-side parallel rows but which are parted at intervals for the side-by-side lays of at least one other similar yarn strand to pass therebetween in intersecting relation; adhesively-bonding the skin panel core exposed within the groove to one or both sides of the frame element located proximal thereto using two endless strands of yarn laid back and forth to define a pair of intersecting webs arranged in spaced substantially parallel relation to one another that form a part of the connector and pass through the spaces between the first-mentioned yarn strands.

10 Claims, 11 Drawing Figures

METHOD FOR FASTENING AIRCRAFT FRAME ELEMENTS TO SANDWICH SKIN PANELS COVERING SAME USING WOVEN FIBER CONNECTORS

Some of the aircraft being built in recent years have done away with metal-skinned wings, tail assemblies, engine housings and fuselages in favor of the equally-strong but lighter weight fiber-reinforced composite skin panels. For applications like the aforementioned ones where the structure is subject to bending stresses and the like, especially during flight maneuvers, these skin panels are traditionally made up out of lightweight rigid core materials overlayed on both sides by sheets of some type. These sheets can take a number of different forms among which are "mats" which are made up from randomly-oriented chopped filaments or swirled filaments with a binder bonding them together. Alternatively, these sheet materials can be fabricated out of so-called "endless" filaments which are bundled together and twisted to form strands of yarn that are then woven, laminated together and otherwise manipulated and adhesively-bonded into sheets that comprise the "skin" of the panel. The resulting "sandwich" becomes, therefore, the basic covering material.

Straps or bands woven out of the endless yarn strands are not only two dimensional but, in addition, can be woven into a fabric which is comprised of even more complex shapes that are three dimensional in that one or more integrally-formed substructures in the form of webs intersect the plane of the two dimensional sheet. The method soon to be described which forms the subject matter herein disclosed and claimed uses such a three dimensional woven multifilament yarn product in the form of an elongate strap or band.

Sandwich constructions of the type just described exhibit the properties of a beam with the core corresponding to the web while the facesheets function in the manner of the flanges. These facesheets carry the axial, tensile and compressive loads, whereas, the core sustains the shear and compressive stresses normal to the skin and thus prevents wrinkling or buckling under axial compressive loads. Specifically, with reference to an aircraft wing having spars housed between upper and lower skin panels extending spanwise thereof, each of the latter being of the aforementioned sandwich construction, and all these elements together with the ribs cooperating with one another to define a shaped airfoil; in the resulting so-called "monocoque" sandwich structure, the axial forces of tension and compression brought about by the bending moment loads are carried entirely by the facesheets in the upper and lower skins. In a similar manner, the resulting shearing forces are transferred totally in the webs of the spars.

In the past when attaching a shear web to a sandwich skin panel, two procedures were most often followed. The first of these was to bring the inner and outer facesheets together along the line where the spar would be attached by eliminating the core in this area, then mechanically joining the sides of the spar to the facesheets thus stacked using rivets or other fasteners penetrating the stack together with overlying flanges of a pair of L-shaped connectors attached to both sides of the frame element and running spanwise therealong to complete the joint. While this method was both fast and simple, it produced a structure that sacrificed a significant proportion of its resistance to chordwise bending.

The second method was similar to the first in many respects except that a span-wise strip of resin having a higher density than the rest of the core was integrated into the skin panel underlying both the spar and the outstretched legs of the L-shaped connectors adhesively attached to the inner facesheet. This method was somewhat simpler in that it did not require cutting a channel through the core and then filling it up again with a higher density core. Also, by forming the spar to facesheet connection as described above, the continuity of the core across the joint remained along with its ability to transfer shear. Probably the only real shortcomings of this last method was its inherent increase in weight and the fact that it became much more labor-intensive.

Fabric straps or bands folded lengthwise into an L-shape and bonded or otherwise adhered to adjoining surfaces of the spars or other frame elements and skin panels where they meet to define a sharply-angled corner offers a solution to the skin penetration problem and such joints are widely used although they have somewhat more of a tendency to pull away from the corner if overstressed than a joint where the web of the fabric does not have to be folded into an inside corner.

Applicant has now found in accordance with the teaching of the instant invention that while the joints produced by these and other prior art methods for joining frame elements to fiber-reinforced composite skin panels have proven satisfactory and, for this reason, are in widespread use, nevertheless, they can be improved upon by the simple, yet unobvious, expedient of using a three dimensional woven fiber strap or band of conventional construction having a generally H-shaped cross section in a totally unique way that takes maximum advantage of the inherent superior ability of the yarn strands made up of bundles of endless filaments to carry large tension loads. Specifically, what will be denominated here as the "crossbar portion" of the H-shaped strap or band projects laterally on both sides beyond its transversely-spaced intersecting webs of the woven connector that define what will be referred to here as the "upright portions" of the "H". The aforementioned crossbar portion forms the means for bridging the gap which is produced in the inner facesheet of the skin panel that has been cut apart when the groove is routed therein adjacent which the spar or other analogous frame element will be fastened. The "fill" strands of this crossbar portion, when adhesively-bonded to the inner facesheet adjacent the groove edges, re-establish its continuity across the joint. Both upright portions of the strap do likewise by establishing an adhesively-bonded woven fabric bridge interconnecting the edges of the core exposed at the sides of the groove in the skin panel and the more or less aligned faces of the spar positioned proximal thereto. Any chordwise bending load tending to widen the gap in the inner facesheet is resisted by these same fill filaments in the crossbar portion of the H-connector that bridge the latter and which are placed in tension or compression. In the same way, any load tending to pull the spar out of the channel formed by the medial section of the crossbar portion and the limbs of the upright portions bonded to its sides is resisted by the entire upright portions of the H-connector as their corresponding "fill" filaments are placed in tension. Thus, before the sharply-angled portions of the H-shaped strap or band connector defined by the juncture between the crossbar and upright portions can pull loose at the correspondingly-shaped corner defined between the spar and skin panels, the tensioned fill filaments bridging the gap or those extending vertically alongside the latter must give way by breaking, stretching or fracturing the adhesive shear bond since no filament in the connector goes around this corner, just straight through the intersection.

As has already been done to some limited degree, all of the aforementioned yarn strands made up of bundles of individual filaments which extend transversely of the length of the woven strap connector, regardless of whether they form parts of the crossbar portion or upright portions of the "H" will, for purposes of the present description, be referred to as the "fill" strands in accordance with conventional weaving and composite materials terminology. In a similar manner, those yarn strands extending longitudinally of the H-shaped strap will, henceforth, be known as "warp" strands. The term "yarn" as used herein is intended to identify bundles of individual elongate filaments laid alongside one another to form a multifilament bundle thereof that comprises the basic element of the weave. Similarly, filaments and strands of yarn having a length greatly exceeding their cross sectional area will be referred to as "endless", again in accordance with accepted composite material terminology.

The filling of the channel or void between the legs of the tape connector that will eventually be seated in the groove and adhesively attached to the edges of the core exposed within the latter has, as its principal function, that of backing up these connector legs thus insuring that they make broad area contact with the adjacent core surfaces resulting in a secure bond between them. Bridging the gap left by the groove in the core material with the rigid foam insert between the aforementioned legs of the connector does, of course, restore its continuity and, at least to some extent, its ability to transfer the shear load across the gap.

The warp strands of the connector are interwoven among the fillstrands at right angles thereto in the manner of the more common woven fabric structures; however, the fill strands of the crossbar portion which for purposes of the present description will be said to extend horizontally are spread apart at spaced intervals to produce the gaps through which the vertically-extending fill strands of the upright portions of the H-connector pass, and vice versa. The warp strands are not without function in the woven connector used in accordance with the teaching of the instant invention since they resist the compression loads experienced primarily by the inner facesheets of the skin sandwiches and the tension and compression loads applied to the outer facesheets as the wing is bent about chordwise axes.

It is, therefore, the principal object of the present invention to provide a novel and improved method for fastening aircraft wing spars and analogous frame elements to fiber-reinforced composite structures using a generally H-shaped woven strap connector.

A second object of the invention is the provision of a method of the type aforementioned that uses a woven H-shaped connector as the means for effecting an adhesively-bonded shear load tie between both the inner and outer facesheets of a sandwich construction skin panel and a sandwich web panel.

Another object of the invention herein disclosed and claimed is to restore the continuity of the inner facesheet in a grooved sandwich type composite skin panel by bridging the gap therein caused by the groove using equivalent strength fibers woven into the crossbar portion of an H-shaped woven connector adhesively-bonded thereto.

Still another objective of the invention is the provision of a method for fastening sandwich construction skin panels to sandwich web frame members which utilizes a woven H-connector that includes intersecting webs, the fill filament bundles of which are not bent around corners but instead remain essentially straight and thus fully capable of resisting tension loads applied to their ends.

An additional objective is the provision of a "slip-joint" attainable through the use of one pair of spaced parallel limbs in the upright portions of the H-connector which allows for considerable assembly tolerance when the spar or other frame element is connected to the skin panel.

Further objects are to provide a method for connecting frame members of one type or another to sandwich skin panels which is simple, fast, versatile, easy to use and devoid of metal fasteners thus leaving the outer facesheet intact and without puncture holes; one that provides a low-weight assembly with superior strength when compared with prior art methods employed for the same purpose; and a method of the class described that takes full advantage of the ability to weave the connector in virtually unlimited lengths thereby accommodating long spar-to-skin joints and the like.

Other objects will be in part apparent and in part pointed out specifically hereinafter in connection with the description of the drawings that follows, and in which.

Figure 1:
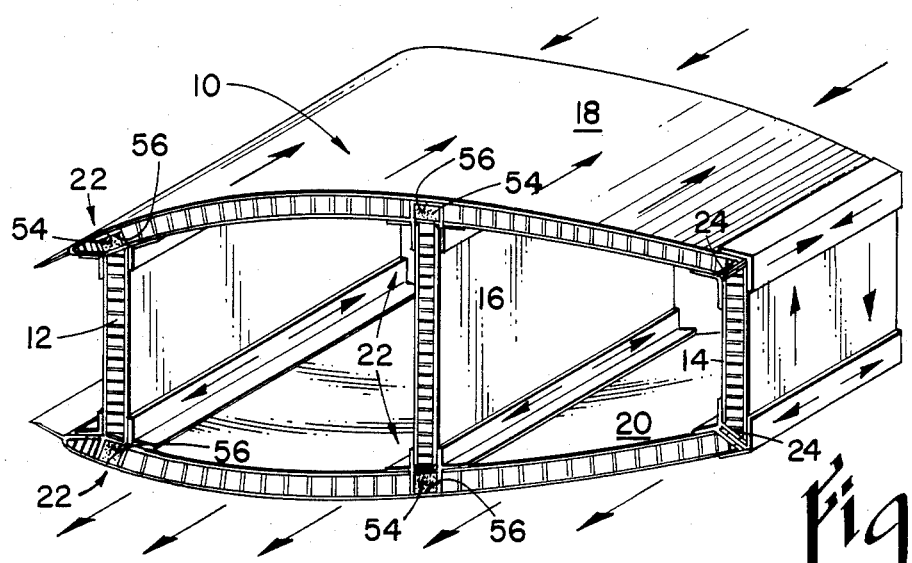
FIG. 1 is a fragmentary view, partly in section, showing in perspective a portion of an aircraft wing which includes the spanwise spars and the skin panels, all of which have been illustrated as being of sandwich construction and joined together by an H-shaped woven connector to define a box beam.

Referring next to the drawings for a detailed description of the present invention, FIG. 1 shows a section of an aircraft wing in the form, of a box beam indicated in a general way by reference numeral 10 which is made up of fore and aft spars or frame elements given numerals 12 and 14, respectively; a center spar or frame element 16; upper and lower skin panels 18 and 20, respectively; one type of joint indicated broadly by reference numeral 22 shown connecting the upper and lower edges of the fore and center spars to the upper and lower skin panels; and quite a different joint 24 connecting the aft spar 14 to the rear skin panel edges. In the enlarged fragmentary detail of FIGS. 2 and 3 where the joint 22L formed between the lower edge of the center spar 16 is made with the lower skin panel 20, both the spar and panel can be seen as sandwich structures wherein a pair of facesheets are adhesively-bonded to opposite faces of a rigid core material. The fore and aft facesheets 26 and 28, respectively, together with the core 30 therebetween when bonded together produce the spar web which is a special type of frame element, the function of which is to transfer shear as well as to hold the skin panels above and below the latter in precise fixed spaced relation to one another while cooperating with the ribs (not shown) to produce an airfoil. In a similar manner, the inner and outer facesheets, 32 and 34, respectively, of the lower skin panel 20 are adhesively-bonded top and bottom to a suitable core 36. The method of using the woven fabric H-connector that has been indicated broadly by reference letter H to effect a connection between the aforementioned frame elements and sandwich skin panels is the subject of the instant invention.

Figure 4:
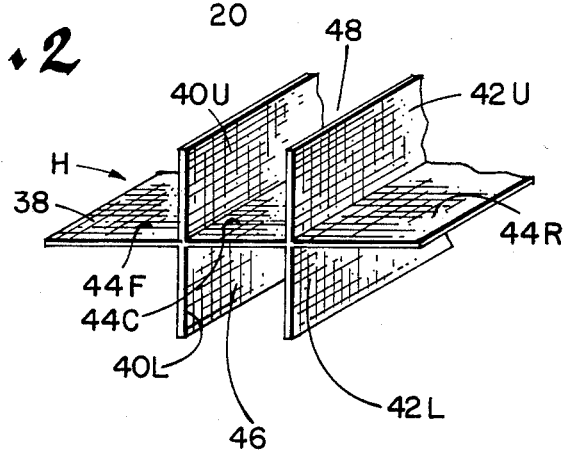
FIG. 4 is a fragmentary perspective view like the preceding figures and to approximately the same scale as FIGS. 2 and 3 showing the woven fiber H-shaped connector used to join the spars to the skin panels before it is laid up in the forming tool and treated to rigidify same.

Before proceeding with a description of the joint 22 and the method of constructing same, it is important that one understand the construction of the woven web connector H for which purpose reference will next be made to FIGS. 4 and 5. In FIG. 4 it will be seen that the connector is generally H-shaped in cross section having a crossbar portion 38 intersected intermediate its side margins by a pair of transversely-spaced substantially parallel upright portions 40 and 42. The crossbar portion 38 has flanges 44F and 44R projecting fore and aft of the upright portions 40 and 42 as shown. In addition, the crossbar portion includes a medial web-forming section 44C located between the upright portions that cooperates with two of their limbs 40L and 42L on the same side thereof to define a foam-receiving channel 46. In like manner, this same medial section 44C of the crossbar portion cooperates with the remaining two limbs 40U and 42U of the uprights to define a second web-receiving channel 48.

Figure 5:
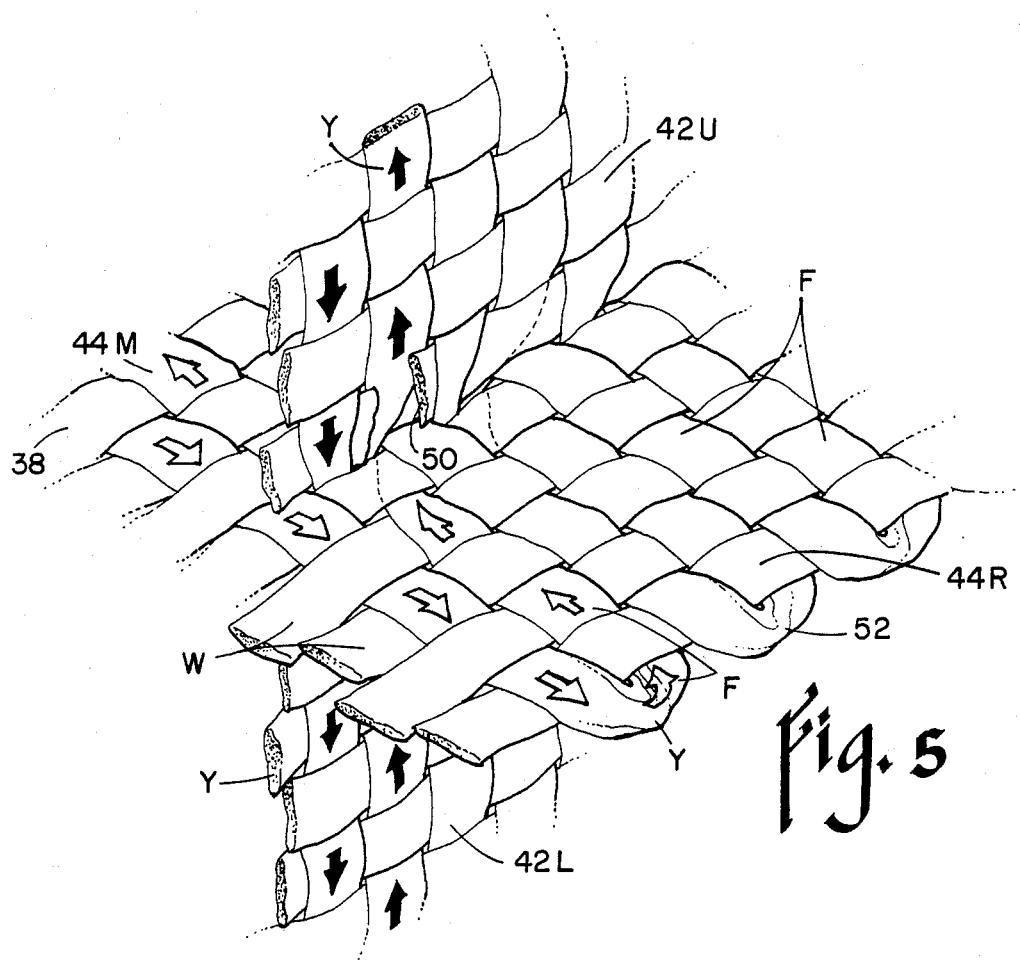
FIG. 5 is a still further enlarged fragmentary perspective view showing a portion of the woven connector with particular emphasis upon the weave of the yarn strands, both fill and warp, that make it up.
Figure 6:
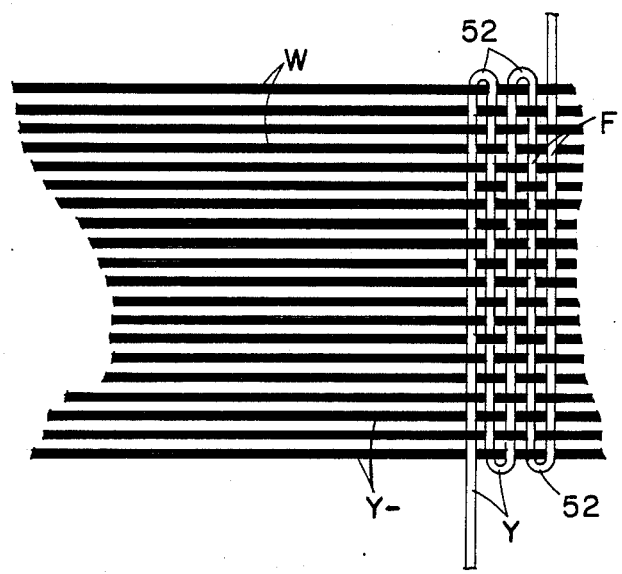
FIG. 6 is a fragmentary plan view to a much smaller scale than FIG. 5 revealing the weave pattern in which the fill strands are interwoven among the warp strands.

Directing the attention next to FIG. 5, it will be noted that the connector H is fabricated from multifilament strands of yarn Y interwoven to produce the H-shaped cross section previously described. Each strand of yarn is made up of a plurality of individual hair-like fibers which may be glass, graphite, a material sold under the trademark "Kevlar" or whatever other substance one wishes to use having the properties required in the finished joint. In FIGS. 5 and 6, the warp strands carry the designation W while those of the fill are identified with the letter F. The white arrows trace the course of a single fill strand making up the crossbar portion 38 of the connector H and particularly the aft flange 44R of the latter. Several significant features should be noted, perhaps the most important of which is the fact that each fore and aft run thereof does not go up or down but rather extends right through the intersection formed by the strands of the upright portions 40 and 42 indicated by the black arrows and which are pushed aside to create a gap most clearly seen at 50 accommodating same. In like manner, the adjacent fill strands 38 of the crossbar portion identified by the white arrows are parted to create a gap through which the strands of the aforementioned upright portion 40 and 42 identified by the black arrows pass. The warp strands W, on the other hand, weave over and under adjacent strands of the crossbar portion as well as in front of and behind the adjacent strands of the upright portions.

Referring next to FIGS. 5 and 6, it will be seen that the adjacent runs or lays of the fill strands F in both the crossbar portion and the upright portions of the connector lie in side-by-side parallel essentially contacting relation except at the intersections where they must be parted to create the gaps necessary for intersecting fill strands to pass through, all of which can be most easily followed by tracing the paths of the black and white arrows. In the particular form illustrated in FIGS. 5 and 6, all the fill strands are continuous in that they are laid back and forth reversing direction at each end to produce a finished edge identified by the numeral 52 where one of the crossbar strands is shown passing over the top of the outermost warp strand on the near edge before reversing direction and passing back underneath the latter. This same finished edge is found on the front of the crossbar portion and along both the top and bottom edges of the upright portions. The warp strands W, on the other hand, are not continuous, but rather, terminate at the remote ends of the tape as can best be seen in FIG. 6. It is worthy of mention, however, that this continuous strand construction found in the fill strands, while most desirable and by far the most practical from a weaving standpoint, is not critical from the perspective of the joint to be formed since each lay or run of all the strands, both fill and warp, are ultimately bonded to a facesheet, a side of the spar or the skin panel core exposed at the sides of the groove 56 routed in the skin panels that is revealed most clearly in FIG. 2. When thus bonded to an appropriate support structure, the fact that the strands terminate or, alternatively, wrap around a warp strand really has little if any structural significance.

Figure 7:
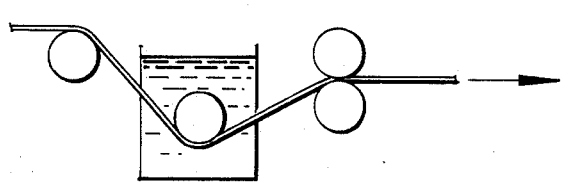
FIG. 7 is a diagram showing the manner in which the woven multifilament strap connector is impregnated with resin before being rolled and dried.
Figure 8:
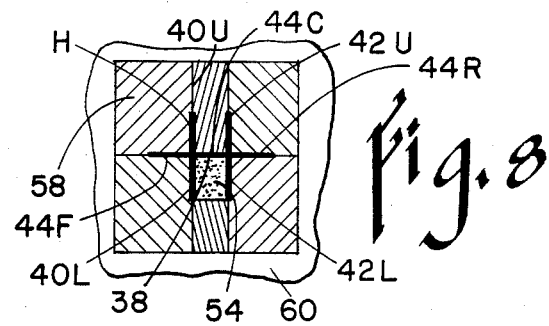
FIG. 8 is a diagram similar to FIG. 7 showing how the connector thus impregnated is laid up in a segmented forming tool which holds it in the desired shape while it is being autoclaved or otherwise treated to cure and harden same.

Before the woven fiber connector H can be laid up in the wing, it is preferably first passed through a bath as indicated schematically in FIG. 7 where it is impregnated with a suitable heat-curable resin. With the tape connector thus impregnated it is held and formed into the shape it will occupy in the finished assembly by means of a multi-segment forming tool 58 that has been illustrated somewhat schematically in FIG. 8. In general, the tool itself is designed to both hold and press against the flanges 44F and 44R of the crossbar portion 38 both top and bottom as well as the limbs 40U and 42U of the upright portions both fore and aft so as to maintain the filaments thereof in compacted relation to one another while they are being cured. The medial section 44C of the crossbar portion 38 is supported by the tool only from above. The same is true of the limbs 40L and 42L of the upright portions which are backed-up by the tool only on the outside. This, of course, leaves the channel 46 defined by the medial section of the crossbar portion and the limbs 40L and 40R of the upright portions free to accept the structural foam insert 54 which is inserted at this time thus providing both the missing support for the underside of the medial section 44C and the inside surfaces of the aforementioned limbs but, in addition, the pressure required to compact the filaments thereof so that they will cure properly. The tool with the connector spread out and its flanges thus compacted is then placed in a heat-resistant bag or envelope 60 and autoclaved or otherwise treated to cure same. When the tool is disassembled, the connector H will be cured and in the precise shape required for the final assembly into the wing or other component.

Referring briefly again to FIG. 4, in the particular form in which the connector has been shown therein, it will be seen that the limbs 40U and 42U of the upright portions have their free edges 62U and 64U flared fore and aft slightly. The purpose for this is so that they will more easily receive the spar web 16 in the manner shown in FIGS. 2 and 3.

Figure 9:
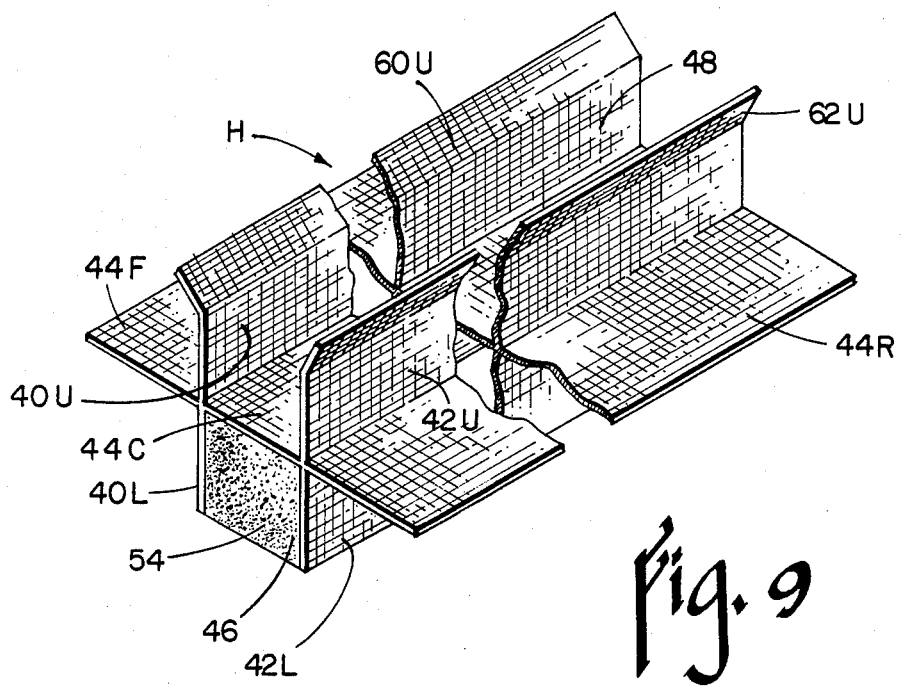
FIG. 9 is a fragmentary perspective view much like FIG. 4 but to a slightly larger scale showing the cured and rigidified connector with the foam insert in place therein.
Figure 2:
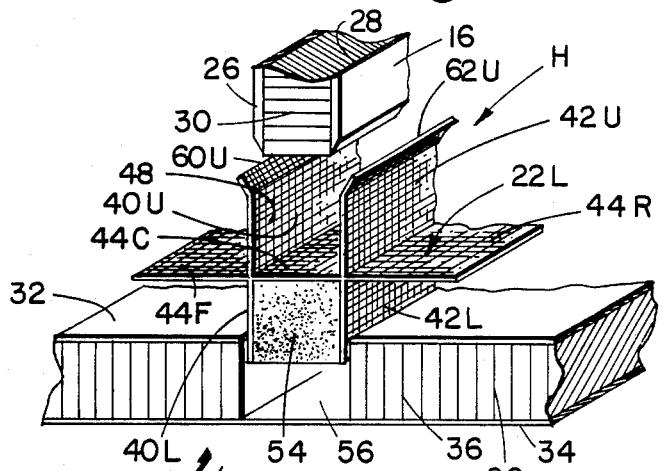
FIG. 2 is a fragmentary perspective view, partly in section and much like FIG. 1 but to a greatly enlarged scale, showing the elements of the joint assembly preparatory to being moved into final position and bonded together;.
Figure 3:
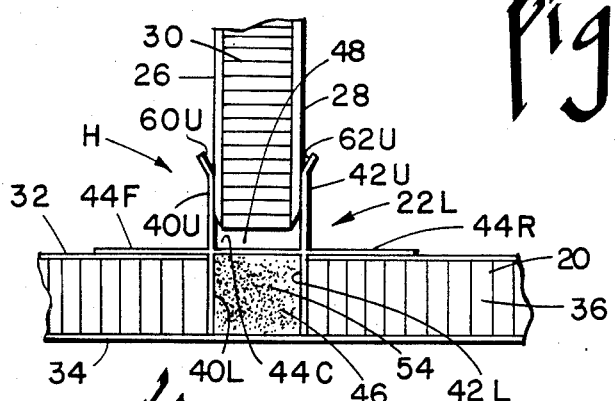
FIG. 3 is a fragmentary perspective view like FIG. 2 and to the same scale showing the completed joint.

Following the autoclaving or other curing operation, the connector H will be as shown in FIG. 9 and already contain the structural foam filler 54. In FIG. 2, the lower skin panel 20 has been shown grooved and ready to receive the foam-filled channel 46 of the connector. Groove 56 is routed spanwise of the wing, both top and bottom, to receive the aforementioned foam-filled portion of the rigidified connector located either above or below the crossbar portion 38. Once the outer surfaces of the limbs 40L and 42L of the upright portions of the connector are adhesively-bonded to the core of the skin panel sandwich exposed within the groove 56 and the bottom of the foam insert is similarly bonded to the exposed inner surface of the outer facesheet 34 which is left intact, the gap produced by the groove 54 is filled although the foam filler has little, if anything to do with restoring the facesheets lost resistance to bending, the latter having been provided to some extent at least by the connector itself. This same groove has cut through the inner facesheet 32 and thus destroyed its continuity. When, however, the fore and aft flanges 44F and 44R of the connector are bonded to facesheet 32 on opposite sides of the groove, this continuity is restored and, most significantly, the strands of the connector bridging the gap formed by the groove extend straight across the latter so that they can be loaded in either tension or compression. With the limbs 40U and 42U of the upright portions of the connector properly bonded to the sides of the spar web 16 in the manner shown in FIG. 3, a continuous load path between the latter and both the inner and outer facesheets of the skin panel is established. Note also in connection with FIG. 3 that the spar web is not shown seated all the way to the bottom of spar-receiving channel 48 of the connector. These flanges 40U and 42U of the uprights, therefore, allow for considerable tolerance in the connections between the spars and skin.

Figure 10:
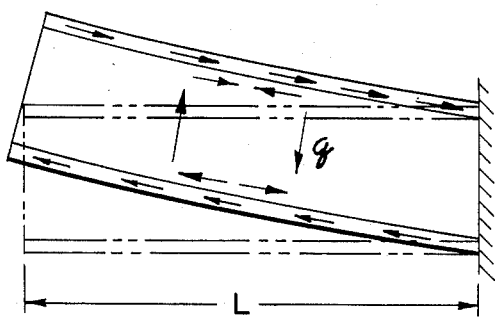
FIG. 10 is a diagram illustrating the manner in which a section of an aircraft wing responds to bending loads; and, FIG. 11 is a fragmentary perspective view very much like FIG. 3 except that it shows some of the major forces acting on the joint and the inner and outer facesheets of the lower sandwich skin panel it attaches to the spar web.

Turning attention next to FIG. 10, it can be seen that when the wing bends, the upper skin panel is in compression while the lower skin panel is in tension. The bending moment is represented by the equation:

$$(M) = P \times L$$

where M is the bending moment, P is the bending force and L is the length of the moment arm, in this case the wing. The shearing force (q) in the above diagram resists the relative slipping motion of the upper and lower skin panels caused by the upper skin panel trying to contract and grow shorter due to compression while the lower skin panel extends and stretches due to the tension in the system. In a sandwich structure like those shown here, the axial forces of tension and compression that result from the bending forces exerted on the wing are carried by the inner and outer facesheets in the skin panels. More significant, however, for purposes of the present invention is the fact that the resultant shearing forces are transferred totally in the webs of the spars where the connector provides a continuous load path between the spar web and both the inner and outer facesheets.

Figure 11:
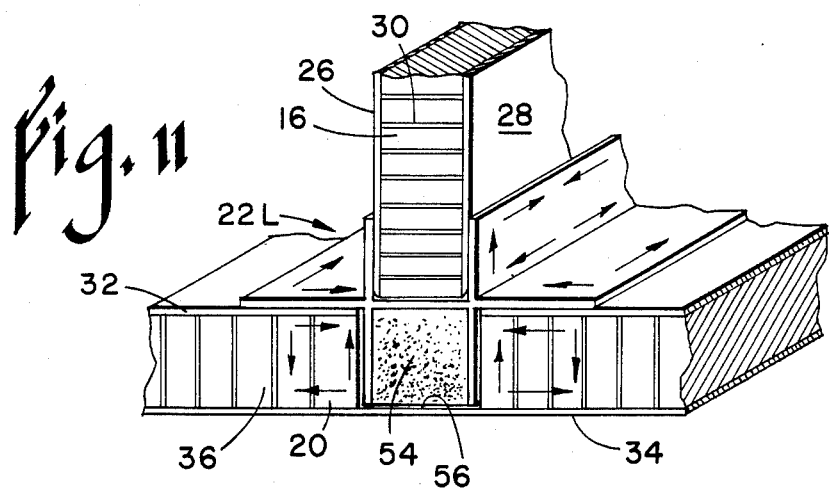

Finally, with particular reference to FIG. 11, it can be seen that the H-connector provides a structural joint joining the spar to both the inner and outer facesheets of the sandwich skin panels, both upper and lower. In so doing, the skin panels are, for all practical purposes, left continuous and undisturbed. The grooves in the skin panels are replaced with the portions of the H-shaped connector bonded to the exposed edges thereof along with the foam filling the space between the two, the latter functioning to restore the continuous shear joint while, at the same time, backing up these portions of the connector thus insuring that they make the broad area contact with the skin panel core required for a reliable adhesively-bonded connection. The gaps left in the inner facesheets are bridged by the crossbar portion of the H-connector extending thereacross and bonded to the facesheet surfaces adjacent the groove. In a similar manner, the upright portions of the H-connector provide a continuous load path between the spar webs and both the inner and outer facesheets. As indicated by the arrows in FIGS. 1 and 11, the facesheets of the skin panels carry the axial tensile and compressive stresses while the core sustains the shear and compressive stresses normal to the skin and thus prevent the skin from wrinkling or buckling under axially-directed compressive loads.

Accordingly, a wing constructed in accordance with the above-described method using a woven H-shaped connector results in an efficient connection because, among other features, it utilizes a redundant double shear bond joint with the spar web. Also, assembly is simple and fast because the spar web need only be slipped into the opposed channels of the H-connectors sitting atop the grooves. Moreover, since these web-receiving channels are quite deep, it is not necessary that the spar web seat all the way to the bottom and this, of course, provides ample assembly tolerances.

Finally, while the method forming the subject matter hereof has been described in detail in connection with the wings and spars of a sandwich paneled aircraft, shear, tensile and compressive forces are also at work in other portions of the assembly like, for instance: canards, the elements of the tail subassembly and even the longitudinal stringers that form parts of the frame structure supporting the walls of the fuselage. For this reason, the assembly techniques used in the spar-to-wing connection are equally applicable to other sandwich panel-to-frame connections and the claims which follow have been so worded.

What is claimed is:

1. The improved method for joining aircraft sandwich skin panels of the type including a core bounded both inside and outside by inner and outer facesheets to a longitudinally-extending frame element which comprises: cutting a longitudinally-extending groove through the inner facesheet and core exposing the edges thereof while leaving the outer facesheet intact; interweaving a first fill set of multiple fiber strands of yarn arranged in transversely-extending side-by-side relation to form a crossbar portion with a second fill set thereof intersecting said first fill set to define an upright portion, said intersecting crossbar and upright portions cooperating to produce a band thereof having a generally cruciform-shaped cross section with four quadrants; interweaving a third warp set of longitudinally-extending multiple fiber yarn strands with the first and second fill set thereof; treating the strands thus interwoven to rigidify same; bonding a structural insert sized for insertion into the skin panel groove to the strands defining one of the quadrants; bridging the gap in the inner facesheet created by the groove with the crossbar portion defined by the first fill set of multiple fiber strands and adhesively-bonding the latter to said facesheet to reestablish its continuity; inserting the structural insert into the groove and adhesively bonding the upright potion defined by the second fill set of strands alongside thereof to the adjacent exposed edge of the core to restore the resistance to bending of the associated skin panel; establishing a continuous load path between said inner and outer facesheets and same frame element by adhesively-bonding the latter to that part of the upright portion comprising those strands of the second fill set thereof lying outside said groove; and adhesively-bonding said third warp set of yarn strands to the surfaces of the inner facesheet and core adjacent the latter so as to resist the axial tensile and compressive forces to which the skin panels are subjected as the assembly bends.

2. The method as set forth in claim 1 which includes: interlacing a fourth fill set of yarn strands with those of the third warp set so as to pass through gaps between adjacent strands of the first fill set and produce flanges projecting on both sides of the latter cooperating to define a second upright portion substantially paralleling the upright portion defined by the second fill set spaced to one side thereof approximately the thickness of the element, and adhesively-bonding the flanges of said second upright portion thus produced to those surfaces of the skin sandwich core and frame element left exposed following attachment of the upright portion defined by said second fill set, the upright portions defined by said second and fourth fill sets when thus attached cooperating to define a double shear bond connection between said skin sandwich and frame element.

3. The method as set forth in claim 1 which includes: covering one side of the groove and at least a portion of the outer facesheet in the bottom of said groove with the yarn strands of the upright portion defined by said second fill set thereof.

4. The method as set forth in claim 2 which includes: lining the sides of the groove with the flanges of the upright portions defined by the second and fourth fill yarn strands projecting on one side the crossbar portion defined by the fill yarn strands of said first set.

5. The method as set forth in claim 4 which includes: lining the bottom of the groove using at least one of the flanges of the upright portions defined by the second and fourth fill sets of yarn strands lining the sides thereof so as to box-in the structural insert.

6. The method as set forth in claim 4 which includes: turning the edges outwardly of those flanges of the upright portions defined by the second and fourth fill sets of yarn strands on the opposite side of the crossbar portion defined by the first fill set from those lining the groove so as to guide the frame element into position therebetween.

7. A joint between a sandwich skin panel of an aircraft component and an elongate structural frame element wherein the skin panel comprises a core bounded on opposite faces by inner and outer facesheets, said joint comprising: a groove cut through the inner facesheet intact, a woven fabric connector strap extending longitudinally along the groove and formed by a pair of substantially parallel spaced woven fabric webs intersected by a further woven fabric web to provide the strap with a substantially H-shaped cross-section in which the further web forms the cross-bar of the H-section and has portions projecting transversely from opposite sides of the two spaced webs, each of the webs comprising a plurality of multifilament yarn strands extending side-by-side transversely to the longitudinal direction of the strap and passing directly through the intersecting web or webs, the portions of the two spaced webs of the connector strap on one side of the crossing web being received in the groove and adhesively bonded to the exposed edges of the core along the side walls of the groove, and the transversely projecting portions of the crossing web overlying and being adhesively bonded to the inner facesheet on opposite sides of the groove whereby the crossing web bridges the groove and restores the continuity of the inner facesheet, a structural insert filling the void in the groove between the portions of the webs within the groove, and the frame element having a longitudinally extending edge received between the portions of the two spaced webs on the other side of the crossing web from the groove, said web portions overlying and being adhesively bonded to the opposite faces of the frame element whereby the two spaced webs form continuous load paths between the frame element and the inner and outer facesheets.

8. A joint according to claim 7, which the woven fabric connector strap is impregnated with a heat curable resin and heat cured to render the H-section strap substantially self-supporting.

9. A joint according to claim 7 or claim 8, in which the structural insert is formed by a foam material prelocated between the spaced webs before the connector is fitted into the groove.

10. A joint according to any one of claims 7 to 9, in which the transversely extending yarn strands of each web are formed by a continuous multifilament yarn strand which is woven back and forth across the web.

* * * * *